T. BROWN.

MANURE SPREADER.

APPLICATION FILED SEPT. 18, 1911.

Reissued Nov. 21, 1911.

13,318.

3 SHEETS—SHEET 1.

Witnesses

R. D. Tolman.

Penelope Cornberback

Inventor

Theophilus Brown

By Rufus B. Fowler

Attorney

T. BROWN.

MANURE SPREADER.

APPLICATION FILED SEPT. 18, 1911.

Reissued Nov. 21, 1911.

13,318.

3 SHEETS—SHEET 2.

Witnesses
R. D. Tolman
Penelope Comberbach

Inventor
Theophilus Brown.
By Rufus B. Fowler
Attorney

T. BROWN.

MANURE SPREADER.

APPLICATION FILED SEPT. 18, 1911.

Reissued Nov. 21, 1911.

13,318.

3 SHEETS—SHEET 3.

Witnesses

F. D. Tolman.

Penelope Counterback.

Inventor

Theophilus Brown

By Rufus B. Fowler

Attorney.

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

13,318. Specification of Reissued Letters Patent. Reissued Nov. 21, 1911.

Original No. 986,903, dated March 14, 1911, Serial No. 480,812. Application for reissue filed September 18, 1911. Serial No. 650,009.

*To all whom it may concern:*

Be it known that I, THEOPHILUS BROWN, a citizen of the United States, residing at Worcester, in the county of Worcester and Commonwealth of Massachusetts, have invented a certain new and useful Improvement in Manure-Spreaders, of which the following is a specification, accompanied by drawings forming a part of the same, in which—

Figure 1:
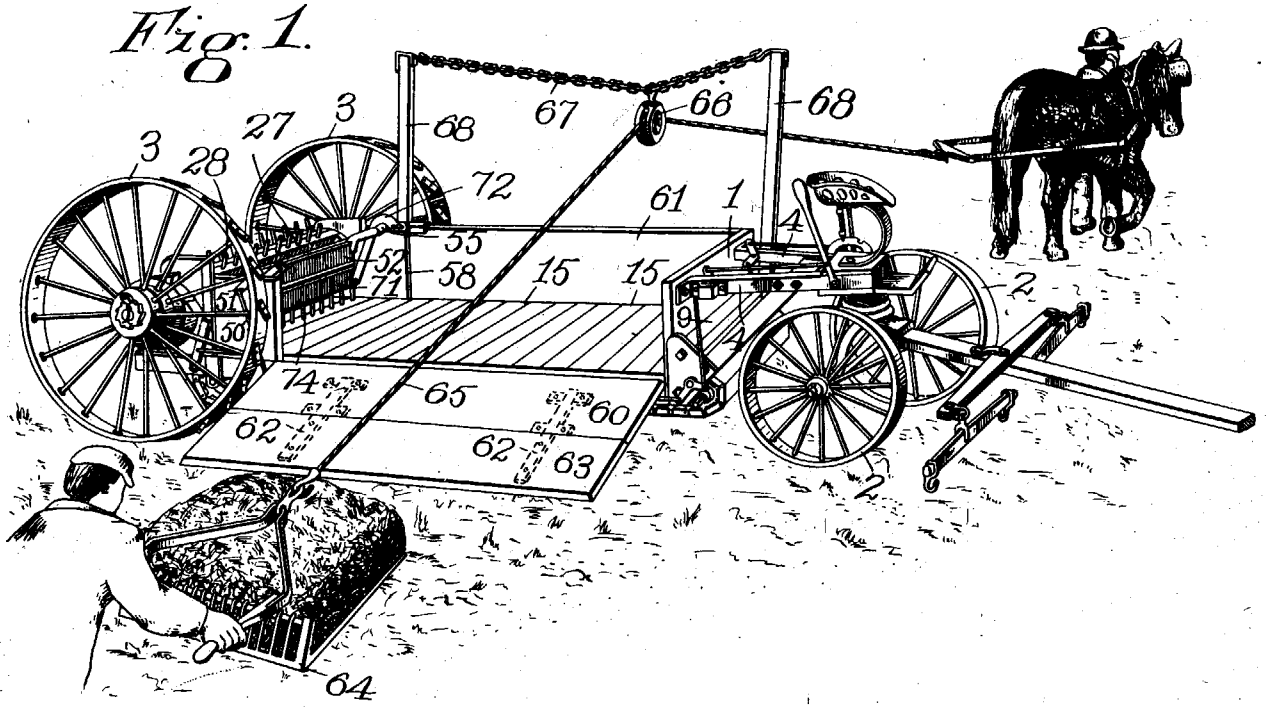
Figure 2:
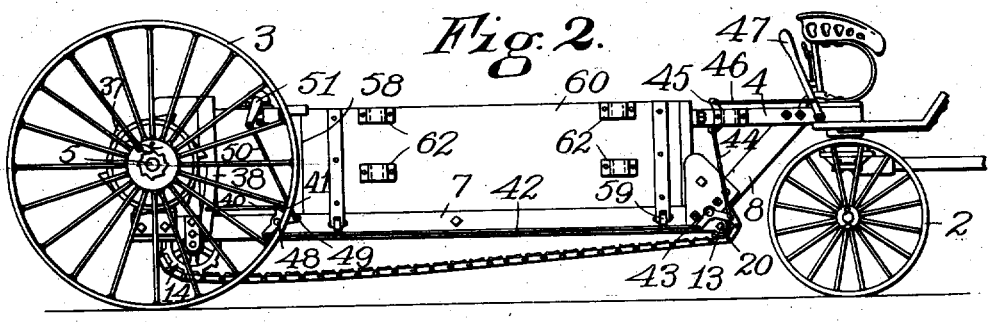
Figure 3:
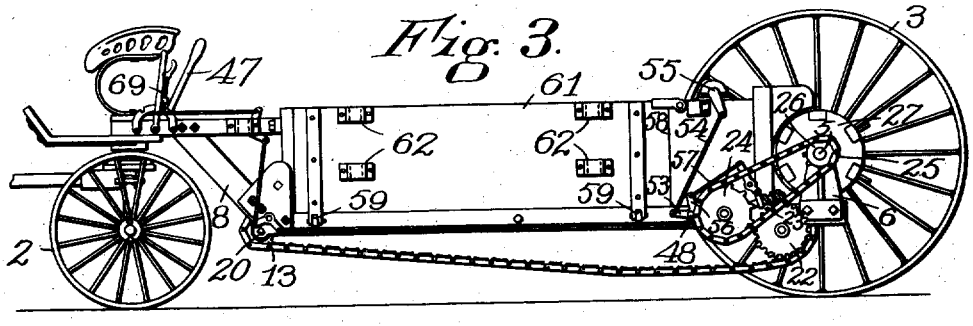
Figure 4:
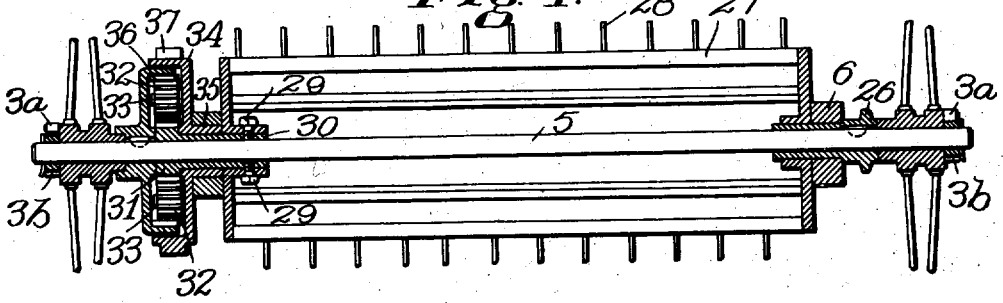
Figure 5:
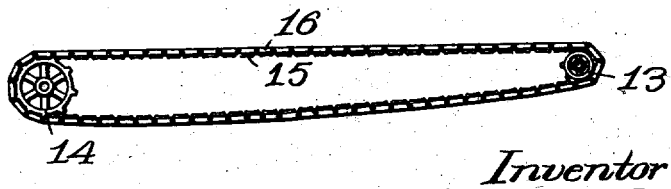
Figure 6:
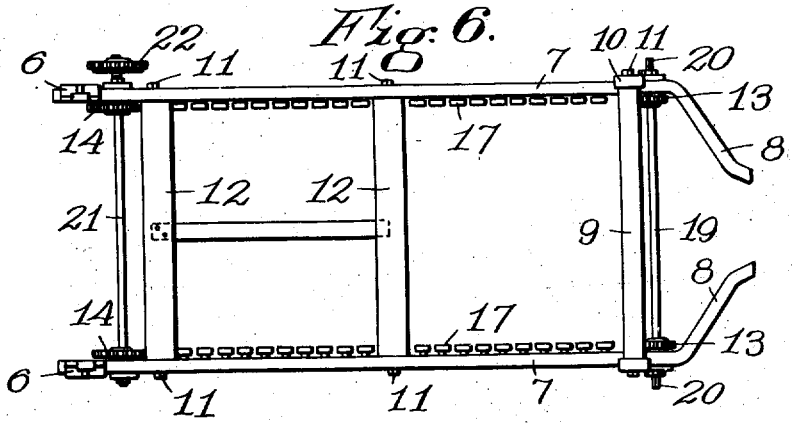
Figure 7:
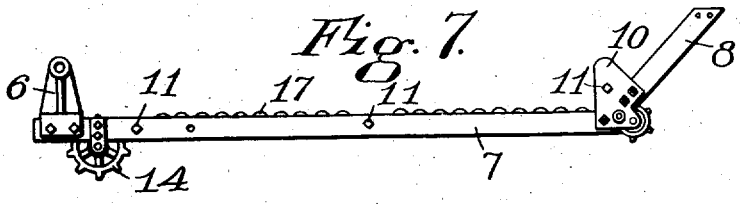
Figure 8:
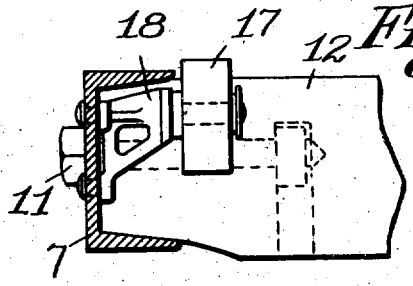
Figure 10:
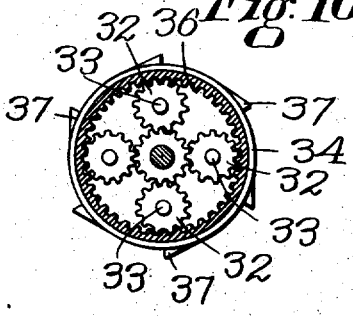
Figure 9:
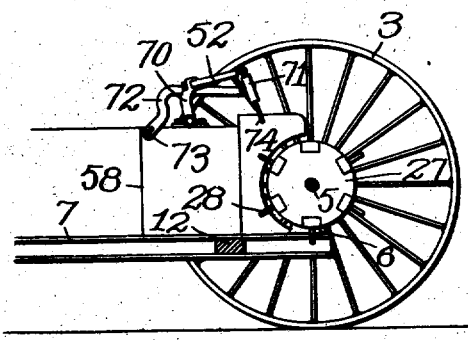

Figure 1 represents a perspective view of a manure spreader embodying my invention. Figs. 2 and 3 are side elevations showing opposite sides of the spreader. Fig. 4 is a central sectional view taken through the beater and its driving mechanism. Fig. 5 is a detached view of the movable bottom and its supporting sprocket wheels. Fig. 6 is a plan view of the framework on which the body is supported. Fig. 7 is a side view of the same. Fig. 8 is a detached sectional view of one of the steel sills showing the attachment thereto of the rollers for supporting the bottom. Fig. 9 is a detached sectional view of the tailboard in a raised position, and Fig. 10 is a sectional end view of the beater driving mechanism.

Similar reference figures refer to similar parts in the different views.

The objects of my present invention are to facilitate the loading of the body of a manure spreader, to provide means for delivering the load in a plane nearer the ground, to simplify and strengthen the construction of the spreader, and to provide an improved driving mechanism for the beater. I accomplish these objects among others, by the construction and arrangement of parts as hereinafter described, the novel features being pointed out in the annexed claims.

The manure spreader to which my invention relates, like those now in common use, comprises a body for holding the load of manure, a rotating toothed beater at the rear end of the body for distributing the load, a movable bottom for moving the load rearwardly toward the beater as the operation of spreading continues, and means capable of being controlled by the driver at the seat for operating the movable parts. My improved beater, however, differs in many essential particulars from those hitherto in use, as will appear from the following description of the accompanying drawings, in which 1 denotes the body of the spreader supported at the forward end upon wheels 2, 2, and at the rear end upon wheels 3, 3. The forward end of the body is provided with a reach 4 which extends from the top of the body forward over the axle of the wheels 2, 2, space being thus provided in turning corners for the wheels 2, 2, to pass under the reach 4, and also allowing the bottom of the body to be supported in a plane lower than the axle of the wheels 2, 2. The rear end of the body is suspended from the rear axle 5 by means of brackets, one of which is shown at 6, Fig. 3, thereby bringing the bottom of the body in a plane below the rear axle upon which the wheels 3, 3, are carried. By this means of supporting the forward and rear ends of the body its bottom is brought comparatively close to the ground, so that the manure in loading requires but a slight elevation. In order to securely support the body of the spreader at its forward end by the forward axle, and with its rear end suspended from the rear axle, I mount the body upon two steel sills 7, 7, consisting of channel bars running lengthwise the body beneath its sides, at the rear ends of which the brackets 6 are riveted. The forward ends of the sills 7 are bent upwardly and inwardly, as shown at 8, 8, Figs. 6 and 7, and are attached to their forward ends to the reach 4. The steel channel bars forming the sills of the body are united at their forward ends by a cross bar 9, bolted at its ends to brackets 10, 10, which are secured to the sills. The middle and rear ends of the sills are attached by joint bolts 11 to wooden spacing bars 12, 12. Bearings attached to the sills 7 are provided for the front and rear sprocket wheels 13 and 14 around which the movable bottom 15 passes.

The movable bottom is constructed in the usual manner by transverse strips attached at their ends to chain links 16 which engage the sprocket wheels 13 and 14, and, in their passage between the tops of the sprocket wheels, rest upon a series of supporting rolls 17, each of which is journaled upon a bracket 18 riveted to the inner sides of the sill 7. The sprocket wheels 13 are carried upon a shaft 19 having at its ends polygonal tips 20, 20, adapted to receive a wrench by which the shaft 19 may be turned by hand and the movable bottom moved backward or forward.

The sprocket wheels 14, 14, are attached to a shaft 21 which carries upon one end a worm gear 22 engaged by a worm 23, having a geared connection, not shown, with a sprocket wheel 24, which is driven by a chain 25 from a sprocket wheel 26 carried upon and attached to the rear axle 5. The driving mechanism for the bottom, which comprises the worm gear 22 and worm 23 is of the usual form of construction now used in manure spreaders, and is substantially like that shown in United States Patent No. 268,410, dated December 5, 1882, and forms no part of my present invention.

The beater, which consists of the revolving cylinder 27 provided with radial teeth 28, is mounted concentrically upon the rear axle 5 and is attached by screws 29 to a sleeve 30, which is capable of turning loosely upon the rear axle 5, and carries upon its opposite end a pinion 31 which engages pinions 32 turning loosely upon studs 33, which are held in a rotatable plate 34, having a hub 35 which is journaled in one of the brackets 6 concentrically with the sleeve 30. The pinions 32 engage an internal gear 36 which is attached by a spline to the rear axle 5. Turning loosely upon the ends of the rear axle 5 are the supporting wheels 3, 3, each carrying a pawl $3^a$ which engages a ratchet wheel $3^b$ attached to the ends of the rear axle 5, so that during the forward movement of the manure spreader the rotation of the supporting wheels 3 is imparted to the rear axle 5, and the rotation of the rear axle 5 rotates the sprocket wheel 26 and the internal gear 36. The plate 34, as the internal gear 36 rotates, is free to rotate with the internal gear, so that a rotary motion of the internal gear 36 is not imparted to the beater through the pinion 31. The plate 34 is, however, provided with a series of external teeth 37 by which the rotation of the plate 34 may be checked by means of a swinging pawl 38 pivoted at 39 to one of the body sills, and connected by a link 40 with one arm of a rocking three armed lever 41 on a rocking shaft 48, which is connected by a link 42, bell crank 43, link 44, bell crank 45, and link 46 to a hand lever 47 near the driver's seat, which enables the operator at will to swing the upper end of the pawl 38 into the path of the revolving teeth 37, thereby checking the rotation of the plate 34 and holding the pinions 32 stationary, so that rotary motion will be imparted to the pinion 31 by the rotation of the internal gear 36 and thereby revolving the beater.

The third arm 49 of the three armed lever 41 is connected by a link 50 with a bell crank 51 journaled upon the top of one of the sides of the body, and connected with one end of a tailboard 52, Fig. 1, by which the load of manure is held from working back and impeding the starting of the beater as the spreader is driven to the field. Upon the opposite end of the rocking shaft 48 is attached a two armed lever as shown in Fig. 3, one of the arms 53 being connected by a link 54 with a bell crank 55, similar to the bell crank 51, journaled upon the upper edge of one of the sides of the body and connected with the opposite end of the tailboard 52. The other arm 56 of the two armed lever carried upon the rocking shaft 48 is connected by a link 57 with operative mechanism for throwing the worm 23 into and out of engagement with the worm gear 22, in a similar manner to that described in United States Patent No. 268,410, dated December 5, 1882.

The rocking of the shaft 48 in one direction, by means of a lever handle 47 serves to raise the tailboard, to connect the movable bottom with the driving power by means of the worm 23, and to put the beater in operation by swinging the pawl 38 into the path of the teeth 37, and the reverse movement of the lever handle 47 will lower the tailboard, disconnect the movable bottom and check the operation of the beater.

As the axis about which the wheels 3, 3, revolve is placed at the extreme rear end of the body coincident with the axis of the beater, the wheels 3 are caused to cover but a small portion of the sides of the body, leaving the entire sides between the extreme forward end of the body and the line 58 exposed, and thereby removing from the greater portion of the body the impediment to loading presented by the large supporting wheels 3, 3.

The rocking shaft 48 is journaled in the framework of the body to the rear of the line 58, and the link connections between the rocking shaft 48 and the lever handle 47 which traverse the length of the body, are located in a plane below the sides of the body, thereby enabling all that portion of the sides in front of the line 58 to be either attached to stakes held in stake irons or, as in the present instance, to be hinged to the sills at 59, so that the sides 60, 61, may be removed from their upright position to obviate the necessity of loading the body over the top of the sides. In the present instance I provide the sides 60, 61, with stake irons 62 to receive stakes attached to an extension, shown at 63, Fig. 1, where one of these extensions is shown applied to the side 60 in order to increase the width of the side and enable its outer edge to rest upon the ground and form an incline over which manure may be drawn by a scraper 64, by means of a cable 65, passing through a pulley block 66 supported in any convenient elevated position in order to enable horse power to be applied to the loading of the body. As represented in Fig. 1, the pulley block 66 is suspended from a chain 67 stretched across the upright stakes 68, 68, supported at their lower ends by the framework of the body.

In the operation of loading, the manure may be deposited upon the movable bottom through the open side of the body and opposite the sides 60, 61. The load may then be moved back against the tailboard 52 by applying a crank to the polygonal tips 20 of the sprocket shaft 19, and the loading continued at the vacant space at the forward end of the body.

Means for changing the speed of the movable bottom during the operation of spreading is provided substantially like that shown in United States Patent No. 268,410 of December 5, 1882, said means being operated by the attendant by a lever handle 69 and intermediate connections which however form no part of my present invention.

The tailboard 52 is attached to the horizontal arms 70 of the bell cranks 51 and 55, and is raised and lowered by swinging the bell cranks as already described, by means of the intermediate connections between the bell cranks and the lever handle 47 located near the driver's seat.

The construction and operation of the tailboard is substantially like that of the tailboard described in United States Patent issued to me May 29, 1906, No. 821,779, said patented tailboard comprising a hinged section corresponding to the transverse bar 71 in the present tailboard, which is hinged to the tailboard 52 and pivotally connected by bent arms 72 with the sides of the body at 73. Depending from the bar 71 are a series of teeth 74 which, when the tailboard is raised into the position shown in Fig. 9, are caused to stand at an oblique angle and contiguous to the revolving teeth of the beater, for the purpose of pulverizing any large lumps of manure that may be thrown by the beater against the teeth 74. When the tailboard is in its lowest position, as shown in Fig. 1, the teeth 74 are supported by the bar 71 so as to clear the movable bottom 15, and the teeth 74 are then brought into substantially the plane of the tailboard 52. As the tailboard is raised, however, by the rocking of the bell cranks 51 and 55 into the position shown in Fig. 9, the hinged bar 71, and teeth 74 are swung upon the tailboard 52 by means of their pivotal connection with the body of the spreader through the bent arms 72 in order to bring the teeth 74 at the proper angle, and in proper relation to the beater to serve as a pulverizer.

By my improved construction I lower the center of gravity of the load, render the body easy to be loaded by hand, enable power to be employed in loading as represented in Fig. 1, and provide means for depositing the load upon any portion of the movable bottom most convenient, and moving the same backward against the beater. I also provide means for driving the beater without the use of a sprocket chain and am enabled to entirely inclose the beater driving mechanism. The distribution of manure is accomplished upon a lower plane than in the ordinary type of manure spreaders now in use, and I so construct the tailboard as to enable it to do double duty of protecting the beater and also pulverizing the manure when the latter is in operation. This tailboard, however, when elevated, leaves a passageway for the material at the rear end of the body structure which is normally unobstructed except for the beater or cylinder device itself, the latter when at rest constituting the only means to prevent the escape of the material backward, and when at work, shredding off the material at the rear end of the slowly moving mass, lifting it up in front of the axis of the ground wheels and throwing it over the top of the beater and backward to the ground.

Another important advantage incident to this mechanism arises from this: that it is formed in two parts, namely, a body structure, and a rear-wheel-and-beater structure which, although united together, are independent of each other as concerns their mounting upon the rear wheels. The beater or distributer, as well known, is subjected to very severe stresses and strains in its work of tearing to pieces the tangled and matted load and throwing it backward, and in my case this severe work is taken directly upon the ground wheels as an abutment, this being in contradistinction from the heretofore common construction and arrangement, wherein the beater or distributer has been mounted upon the side boards of the body or upon some relatively light and delicate parts of the framework. Here the beater is practically entirely independent of the body structure, being carried, as aforesaid, directly upon the ground wheels, preferably by a supporting means such as a through axle which binds or braces together the wheels.

I claim,

1 The combination of a body and a movable bottom, an axle journaled at the rear of the body and above the plane of the bottom, supporting wheels carried by said axle, with the sides of the body in front of the periphery of said wheels removable, and means for moving said bottom to carry the load rearwardly during the process of loading.

2. The combination of a body and a movable bottom, a rotatable axle journaled at the rear of the body and above the plane of the bottom, supporting wheels for said axle, a beater rotatable concentrically with said axle, and intermediate driving mechanism between said beater and said axle.

3. The combination with a body and a movable bottom, of a rotatable axle journaled at the rear of the body and above the plane of the bottom, a beater rotatable concentrically with said axle, supporting wheels for said axle, and intermediate driving mechanism between said supporting wheels and said beater.

4. The combination with a body having a bottom, of supporting wheels for said body, a beater rotatable about an axis above the plane of the bottom and coincident with the axes of said supporting wheels, and intermediate driving mechanism between said beater and said supporting wheels.

5. The combination with a body having a bottom, of a pair of supporting wheels having their axes in a plane above said bottom, a rotatable axle journaled in a plane above said bottom, a beater journaled concentrically with said axle and independently rotatable, and means for operatively connecting said axle and said beater at will.

6. The combination with a body having a bottom, of a rotatable axle journaled above said bottom, a rotatable beater concentric with and independently rotatable about said axle, supporting wheels for said body rotatable about axes coincident with the axis of said axle, and intermediate driving mechanism between said beater and said supporting wheels.

7. The combination with a body having a bottom, of a rotatable axle journaled at the rear of the body and above the plane of the bottom, supporting wheels, means for rotating said axle from said supporting wheels, a beater journaled concentrically with said axle and independently rotatable, and means for operatively connecting said axle and beater.

8. The combination with an axle and supporting wheels therefor, connecting mechanism by which the axle is driven in one direction by said wheels, a sleeve rotatable on said axle, a pinion carried by said sleeve, a beater concentric with said axle and attached to said sleeve, an internal gear carried by said axle, a plate rotatable on said axle, intermediate gears carried by said plate and engaging said pinion and said internal gear, and means for checking the rotation of said plate at will.

9. The combination with a pair of rear wheels and a single axle connecting said wheels, a body having its bottom suspended below said axle, a beater journaled concentrically with said axle and above the plane of said bottom, means for rotating said axle, and means for connecting said beater with said axle at will.

10. The combination of a rotatable rear axle, depending brackets journaled on said axle, wheels supporting the ends of said axle, connecting rotating mechanism between said wheels and said axle, a beater concentric with said axle and operatively connected therewith, and a body with the rear end suspended from said brackets below the plane of said beater.

11. The combination with a rotatable rear axle, supporting wheels for said axle, a body suspended from said axle, a rotatable beater concentric with said axle, means for rotating said axle in one direction by said supporting wheels, and means for rotating said beater by said axle in an opposite direction.

12. In a fertilizer distributer the combination with a body structure, of a rear-wheel-and-beater structure, the body structure having a bottom and side walls to contain the material to be distributed by the beater and having means for positively feeding the material to the beater, and the rear-wheel-and-beater structure having rear ground wheels, a relatively rapidly revolving beater or distributer and supporting means for the beater whereby it is carried directly by said ground wheels independently of the body structure, means for supporting the body structure on the rear wheels independently of the beater, a front wheel support for the body structure, and means for rotating the beater oppositely to the ground wheels.

13. In a fertilizer distributer, the combination of a vehicle body, a pair of ground wheels adapted to transmit power, a relatively rapidly revolving beater or distributer rotating oppositely to the ground wheels and adapted to lift material on its forward side and throw it over the top and backward to the ground, supporting means for the beater carried directly by the ground wheels independently of the body, beater-rotating means mounted on said supports, a vehicle body supported on the ground wheels independently of the beater and having side walls and a bottom extending forward from the beater and from the ground wheels, a wheeled support for the front end of the body, and means for moving the material longitudinally through the body to the beater, substantially as set forth.

14. In a fertilizer distributer, the combination of a body structure, and a rear-wheel-and-beater structure united to the body structure, the second of said structures having the rear ground wheels a relatively rapidly revolving beater or distributer adapted to lift material upward and throw it backward over the top to the ground and supporting means for the beater whereby it is carried directly by the ground wheels independently of the body structure, and the said body structure having side walls with a bottom to contain the material to be distributed by the beater and means for feeding the material to the beater, a front wheel support for the body structure, and means for rotating the beater oppositely to the ground wheels, substantially as set forth.

15. In a fertilizer distributer, the combination with a body structure, of a rear-wheel-and-beater structure, the second of said structures having the rear ground wheels a relatively rapidly revolving beater or distributer mounted thereon adapted to lift material upward and throw it over the top backward to the ground and a through axle connecting the rear ground wheels and arranged to support the beater independently of the body structure, and the said body structure having a bottom and side walls to contain the material to be distributed by the beater and means for feeding the material to the beater, the front wheel support for the body structure, and means for connecting the body structure to and supporting it on the wheels and axle independently of the beater, substantially as set forth.

16. In a fertilizer distributer of the class described, the combination of a vehicle body having the bottom and side walls arranged to provide at the rear end a passageway which is normally open on horizontal lines from the said bottom upward, means for carrying the material relatively slowly backward longitudinally through the body to the said passageway, ground-carrying wheels on an axis at the rear end of the body extending through the said passageway, an axle extending from wheel to wheel directly across the body at the said passageway to brace the wheels together, the rear portion of said body resting upon said axle, and a rapidly revolving beater rotating around the axle and supported independently of the body, the rotation of the beater being substantially as set forth whereby it is adapted to lift the material in front of the axle and throw it rearward over the same to the ground.

17. In a fertilizer distributer, the combination of a vehicle body to carry the material to be distributed having a bottom and side walls arranged to provide at the rear end a passageway which is normally open on longitudinal horizontal lines from the bottom upward to the top of the body, ground-carrying wheels for the body on an axis passing transversely through said passageway, a relatively rapidly revolving beater supported on the ground wheels independently of the body and having its forward half arranged to move upward in front of said axis and across horizontal lines passing transversely through the rear end of the body to shred the material to be distributed, and its rear half arranged to move downward across transverse horizontal lines behind the said axis.

18. In a fertilizer distributer, the combination of a vehicle body having the bottom and side walls arranged to provide at the rear end a passageway normally open on longitudinal horizontal lines from the said bottom upward, means for moving the material relatively slowly longitudinally through the body to the said passageway, ground carrying wheels on an axle extending transversely across the said passageway, and a relatively rapidly revolving beater supported upon the ground wheels independently of the body and adapted, when at rest, to close the said passageway and prevent the rearward movement of the material, and, when rotating, to lift the material from the interior of the body, carry it around the wheel axle and deliver it to the ground behind said axle.

19. In a fertilizer destributer of the class described, the combination of a vehicle body having the bottom and the side walls arranged to provide at the rear end a normally open horizontal passageway, means for advancing the material backward through the body to the said passageway, a rapidly revolving beater mounted across the passageway at the rear end of the body and, when at rest, adapted to prevent the escape of material backward from the body, ground carrying wheels on a horizontal axis extending transversely across the passageway at the rear end, the said rapidly revolving beater being mounted directly upon the wheel axis and supported independently of the body walls, and also adapted to engage with the rearward advancing end parts of the mass of material and lift them up in front of and carry them over the axis of the wheels and deliver them backward behind said axis.

20. In a fertilizer distributer, the combination of a vehicle body having side walls and a backward moving bottom adapted to carry the material longitudinally of the vehicle, carrying ground wheels on an axis extending across the body and situated directly at its rear end, supporting devices for the body having a hinge connection with the ground wheels, a rapidly revolving beater rotating around the axis of the wheels and journaled on one of the hinge elements which connect the body to the wheels, and means for rotating the beater in a direction opposite to the rotation of the ground wheels and at a greater speed.

21. In a fertilizer distributer of the class described, the combination of the rear power transmitting ground wheels, a through axle connecting and bracing the said wheels, a load-supporting vehicle body having a backward moving carrier in a plane below the horizontal plane of said axle and relatively near the ground, and a rotary beater or distributer having its upward and backward moving operative part situated in front of the said through axle and adapted to engage with the material at the rear end part of the load before it reaches said axle and lift it and throw it backward over the axle to the ground.

22. In a fertilizer distributer of the class described, the combination of the rear power transmitting ground wheels, a load-supporting vehicle body having a backward moving carrier in a plane below the axis of the ground wheels and relatively near the ground, a through axle extending from wheel to wheel and bracing them together and lying in the lines of the normal path of the said load, a rotating beater or distributer driven from the said ground wheels and having its upward and backward moving operative part situated in front of the said axle whereby said beater is adapted to engage with, lift and throw over the axle the material from the load mass as it is fed backward by the said carrier.

23. In a fertilizer distributer of the class described, the combination of the rear power transmitting ground wheels, a load supporting vehicle body having side retaining walls supported upon the ground wheels and having a backward moving carrier in a plane below the axis of the ground wheels and relatively near the ground, a through axle extending from wheel to wheel and lying in the lines of the normal path of the said load, and a rotating distributer driven from the said ground wheels and supported thereon independently of the said side retaining walls of the body, and having its upward and backward moving operative part in front of the said axle whereby the load is carried over, and delivered behind, the axle.

In testimony whereof, I attach my signature in the presence of two witnesses.

THEOPHILUS BROWN.

Witnesses:

PENELOPE COMBERBACH,
NELLIE WHALEN.

Copies of this patent may be obtained for five cents each, by addressing the "Commissioner of Patents, Washington, D. C."